United States Patent [19]
Ohta

[11] Patent Number: 6,120,153
[45] Date of Patent: Sep. 19, 2000

[54] PROJECTOR

[75] Inventor: Takashi Ohta, Sakai, Japan

[73] Assignee: Minolta Co., Ltd., Osaka, Japan

[21] Appl. No.: 08/960,049

[22] Filed: Oct. 29, 1997

[30]  Foreign Application Priority Data

Oct. 31, 1996 [JP] Japan .................................. 8-290877

[51] Int. Cl.$^7$ .................................................. G03B 21/14
[52] U.S. Cl. ............................................ 353/31; 353/102
[58] Field of Search .................................. 353/34, 20, 31, 353/30, 49, 48, 81, 82, 100, 101, 102

[56]   References Cited

U.S. PATENT DOCUMENTS

| 4,943,154 | 7/1990 | Miyatake | 353/31 |
| 5,331,622 | 7/1994 | Ernst | 359/638 |
| 5,568,315 | 10/1996 | Shuman | 359/634 |
| 5,613,749 | 3/1997 | Shikama | 353/102 |
| 5,626,409 | 5/1997 | Nakayama | 353/31 |
| 5,646,778 | 7/1997 | Shuman | 359/634 |
| 5,657,164 | 8/1997 | Shuman | 359/634 |
| 5,743,610 | 4/1998 | Yajima | 353/31 |

FOREIGN PATENT DOCUMENTS

2-163729  6/1990  Japan .

*Primary Examiner*—William Dowling
*Attorney, Agent, or Firm*—Sidley & Austin

[57]   ABSTRACT

A projector is provided with an illuminator, dichroic mirror for splitting illumination light into a plurality of light components, a plurality of light propagating paths in which the plurality of light components are introduced to corresponding image panels. In a propagating path having a largest distance, there are provided a relay optical system having a relay lens and a field lens. The relay lens and/or the field lens have a refractive index of 1.75 or more.

37 Claims, 7 Drawing Sheets

PROJECTOR

BACKGROUND OF THE INVENTION

The present invention relates to a projector for enlargedly projecting an optical image on a screen.

As a device for displaying a large image, there has been known a projector which generates an optical image in accordance a video signal by illumination light and enlargedly projecting the optical image of illumination light on a screen by means of a projection lens.

Figure 11:
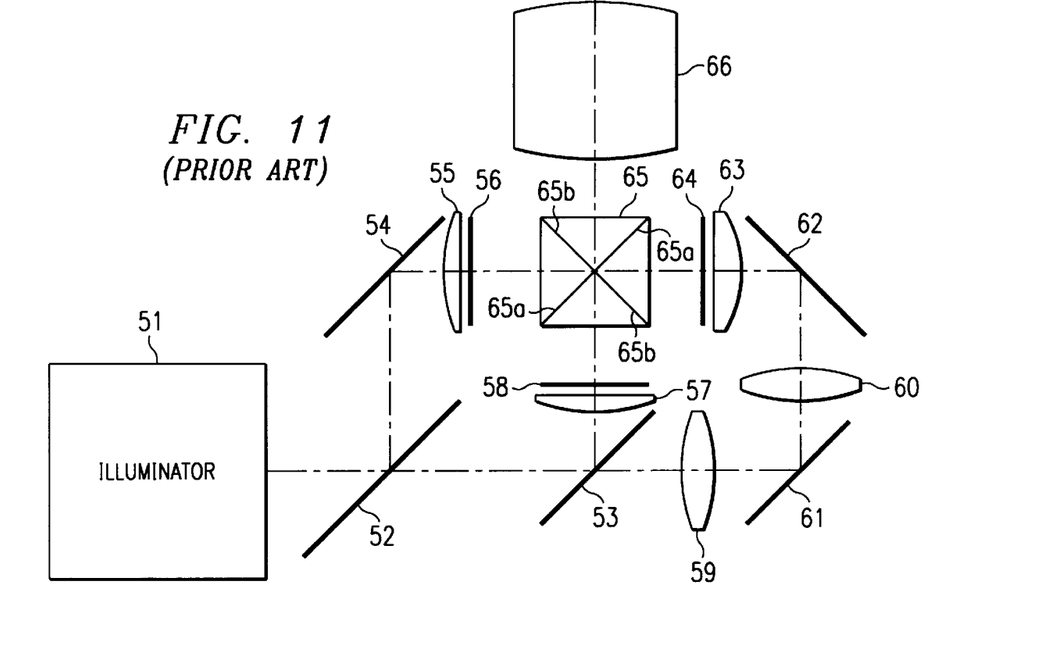
FIG. 11 is diagram showing a construction of a conventional projector.

A conventional projector is described with reference to a construction diagram of FIG. 11. Light emitted from an illuminator 51 is split into wavelength regions of three colors of red (R), green (G) and blue (B) by dichroic mirrors 52 and 53. Specifically, beams of light within a wavelength region of R reflected by the dichroic mirror 52 are reflected by a full-reflection mirror 54, and illuminate an image panel 56 after passing a field lens 55. Beams of light within wavelength regions of G and B pass the dichroic mirror 52. Thereafter, the beams of light within the wavelength region of G are reflected by the dichroic mirror 53, and illuminate an image panel 58 after passing a field lens 57, whereas the beams of light within the wavelength region of B pass the dichroic mirror 53, pass a field lens 63 after being introduced thereto by a relay optical system constructed by two full-reflection mirrors 61, 62, and illuminate an image panel 64.

Optical images formed respectively by the three image panels 56, 58, 64 are combined by a dichroic prism 65. Specifically, the optical image of R formed by the image panel 56 is propagated straight into the dichroic prism 65 as incident light, is reflected at 90° by a first dichroic mirror portion 65a after having been incident thereon at 45°, and emerges toward a projection lens 66. The optical image of B formed by the image panel 64 also is propagated straight into the dichroic prism 65 as incident light, is reflected at 90° by a second dichroic mirror portion 65b after having been incident thereon at 45°, and emerges toward the projection lens 66. The optical image of G formed by the image panel 58 is all propagated straight through the dichroic prism 65 as incident light, without being reflected by the first and second dichroic mirror portions 65a, 65b, and emerges toward the projection lens 66. The optical images thus formed on the three image panels 56, 58, 64 are combined by being directed toward the projection lens 66 located in the same direction while the axes of polarization thereof is made to correspond with the optic axis. The combined optical image is enlargedly projected on the screen via the projection lens 66.

Figure 12A:
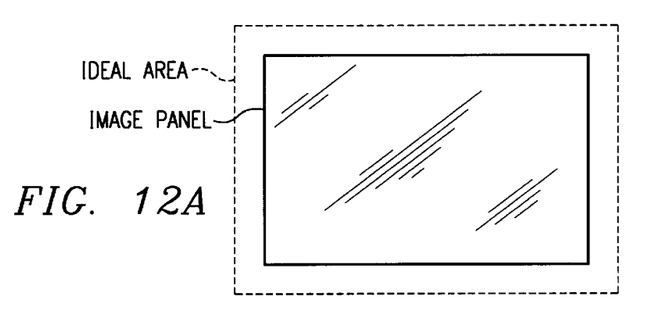
FIG. 12A is a diagram showing an ideal illumination area in the absence of aberration.
Figure 12B:
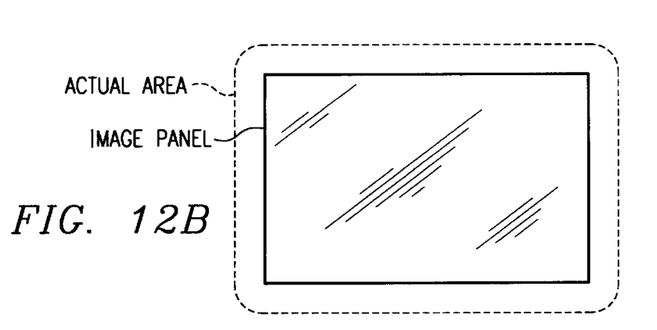
FIG. 12B is a diagram showing an actual illumination area in the presence of aberration.

However, the conventional projector is influenced by the aberration of the lenses used in the relay optical system and the like. Accordingly, the illumination area for projecting the optical image on the image panel 64 is required to be set large. An ideal illumination area in the absence of aberration and an actual illumination area in the presence of aberration are shown in FIGS. 12A and 12B, respectively. In FIGS. 12A and 12B, an area enclosed by broken line is an illumination area and a rectangular area enclosed by solid line is a display surface of the image panel 64. When the aberration of the lens 60 and the field lens 63 is large, the illumination area on the image panel 64 is not similar in shape to the display surface of the image panel 64, and its four corners are rounded.

The illumination area is set larger than the display surface 64 in view of the displacement of the lenses and mirrors. However, the larger the illumination area, the greater a light loss becomes. In this state, the large aberration of the lens 60 and the field lens 63 means that the four rounded corners are larger. This stands for a smaller degree of tolerance for the displacement. In order to ensure a targeted tolerance in this state, the illumination area needs to be further enlarged. However, the light loss becomes even larger accordingly.

Further, the lens 60 and the field lens 63 are coated with three layers of lens coatings to improve light transmission.

SUMMARY OF THE INVENTION

It is an object of the present invention to provide a projector which has overcome the problems residing in the prior art.

According to an aspect of the present invention, a projector comprises an illuminator which produces illumination light, an image member which forms a light image using illumination light, and a light propagation system which propagates illumination light from the illuminator to the image member. The light propagation system includes a plurality of lenses, at least one of the plurality of lenses having such a high refractive index as to assure a necessary illumination area and a necessary light amount.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
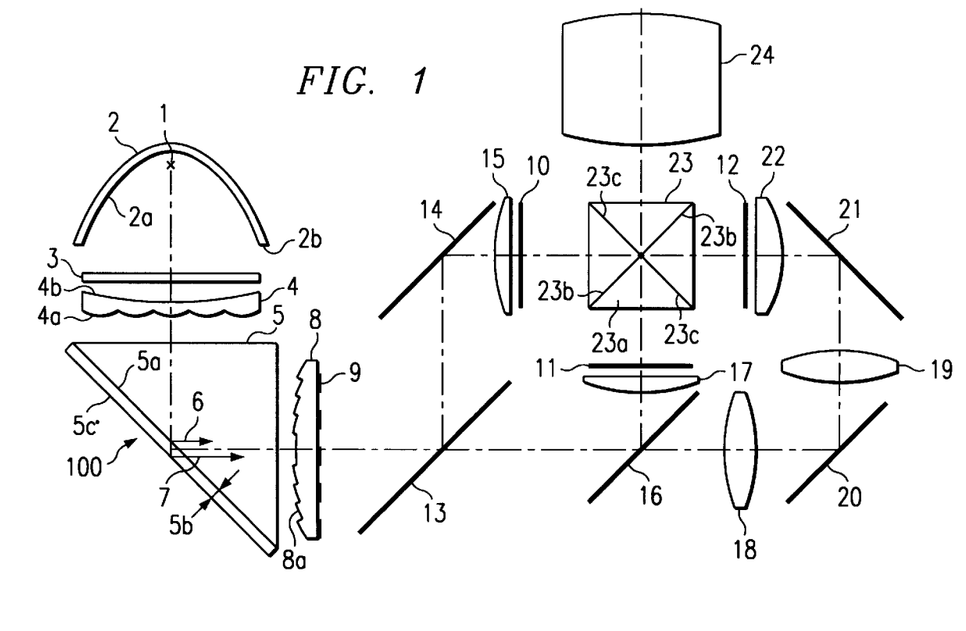
FIG. 1 is a diagram showing a construction of a projector embodying the invention.

Referring to FIG. 1 showing a construction of a projector embodying the invention, a light source 1, an ellipsoidal mirror 2, and an optical integrator 100 constitutes an illuminator.

The light source 1 is a metal halide lamp for irradiating a randomly polarized white light. The ellipsoidal mirror 2 has a reflection surface 2a which is a partial surface including a pole of an ellipsoid of revolution and has a cross section symmetrical with respect to a line. The ellipsoidal mirror 2 is adapted to reflect a light irradiated from a focus (the light source 1 is located in this focus position) to the outside (downward in FIG. 1) of an opening 2b. An IR-UV filter 3 is arranged in vicinity of the opening 2b and is adapted to remove lights in regions unnecessary for lights of three primary colors from the direct light from the light source 1 and the light reflected by the reflection surface 2a.

A first lens array 4 constituting the optical integrator 100 includes a plurality of two-dimensionally arranged lenses 4a on which the direct light from the light source 1 and the light reflected by the reflection surface 2a of the ellipsoidal mirror 2 are incident and from which these lights emerge by being split into a plurality of beams of light. The first lenses 4a have identically shaped apertures. Further, an incidence surface 4b of the first lens array 4 is formed into a concave surface so that the reflection light from the reflection surface 2a and the direct light from the light source 1 become substantially parallel to each other. In other words, the first lens array 4 functions as a concave lens. Accordingly, the beams of light emerging from the ellipsoidal mirror 2 while being converged become substantially parallel beams. The first lens array 4 is located in vicinity of an output side of the IR-UV filter 3 so as to be maximally close to the ellipsoidal mirror 2.

A polarized beam splitter 5, an element of the optical integrator 100, is a splitter of a polarized beam converting optical system in the form of a triangular prism. The splitter 5 splits a plurality of beams of light split by the first lens array 4 into beams 6 of first linearly polarized light components and beams 7 of second linearly polarized light components, the axes of polarization of the first and second linearly polarized light components being normal to each other.

A polarized beam splitting surface 5a is formed on a rear surface of the splitter 5 which is a slanted surface of a right-angle prism. The first linearly polarized light components of the light emerging from the first lens array 4 are reflected at 90° by the polarized light splitting surface 5a after having been incident thereon at 45° and emerge from the splitter 5 as the beams 6. A full-reflection surface 5c is so formed as to face the polarized beam splitting surface 5a at an interval of thickness 5b from the polarized beam splitting surface 5a. The second linearly polarized light components of the light emerging from the first lens array 4 which are normal to the first linearly polarized light components are reflected at 90° by the full-reflection surface 5c after having been incident thereon at 45° and emerge from the splitter 5 as the beams 7. The thickness 5b is set based on the interval between the beams 6 and 7 ($2^{1/2}$ times the thickness 5b) and the interval between second lenses 8a.

A second lens array 8 constituting the optical integrator 100 includes the second lenses 8a which are arranged in a two-dimensional manner in vicinity of a position where the plurality of beams 6, 7 split by the polarized beam splitter 5 converge, and are as many as a sum of the beams 6 and the beams 7. Specifically, the second lens array 8 has twice as many as the first lenses 4a of the first lens array 4, and two second lenses 8a adjacent to each other along vertical direction of FIG. 1 correspond to one first lens 4a.

On a portion of the emergence surface of the second lens array 8 where the beams 7 emerge, there are mounted half-wave plates 9 for converting the second linearly polarized light components of the beams 7 so as to have the same axis of polarization as the first linearly polarized light components of the beams 6. The half-wave plate 9 is a converting portion of the polarized beam converting optical system and constructs the polarized beam converting optical system together with the aforementioned polarized beam splitter 5.

An image panel 10 is a transmission type image panel, e.g., liquid crystal panel, and is adapted to form an optical image of B. An image panel 11 is a transmission type image panel, e.g., liquid crystal panel, and is adapted to form an optical image of G. An image panel 12 is a transmission type image panel, e.g., liquid crystal panel, and is adapted to form an optical image of R.

A color splitting optical system for splitting the beams into those of three primary colors to illuminate the three image panels 10 to 12 with the beams of the corresponding primary colors is constructed by two dichroic mirrors 13, 16. The dichroic mirror 13 has a cutoff value of wavelength 510 nm so as to reflect the beams in the wavelength region of B and cause the beams in the wavelength regions of R and G to pass. A full-reflection mirror 14 is adapted to direct the split beams in the wavelength region of B toward the image panel 10. A field lens 15 is adapted to project the beams in the wavelength region of B reflected by the full-reflection mirror 14 to the image panel 10.

The dichroic mirror 16 has a cutoff value of wavelength 585 nm to reflect the beams in the wavelength region of G among the beams in the wavelength regions of R and G having passed the dichroic mirror 13 and to cause the beams in the wavelength region of R to pass. A field lens 17 is adapted to project the beams in the wavelength region of G split by the dichroic mirror 16 to the image panel 11.

Lenses 18, 19 and full-reflection mirrors 20, 21 constitute a relay optical system for introducing the beams in the wavelength region of R having passed the dichroic mirror 16 to the image panel 12 while keeping their illuminance. The lens 18 is a field lens and the lens 19 is a relay lens.

A dichroic prism 23 is a three primary color combining optical system for combining the aforementioned optical images of R, G and B. Four right-angle prisms 23a are joined together to construct the dichroic prism 23 in the form of a cube or rectangular parallelepiped. At the joined portions of the right-angle prisms 23a, there are formed a first dichroic mirror 23b for reflecting the optical image of B at 90° which has been incident thereon at 45° and causing the optical images of R and G to pass and a second dichroic mirror 23c for reflecting the optical image of R at 90°, which has been incident thereon at 45° and causing the optical images of G and B to pass.

A projection lens 24 is a projecting optical system for enlargedly projecting a color optical image combined by the dichroic prism 23 on a screen (not shown).

Figure 2:
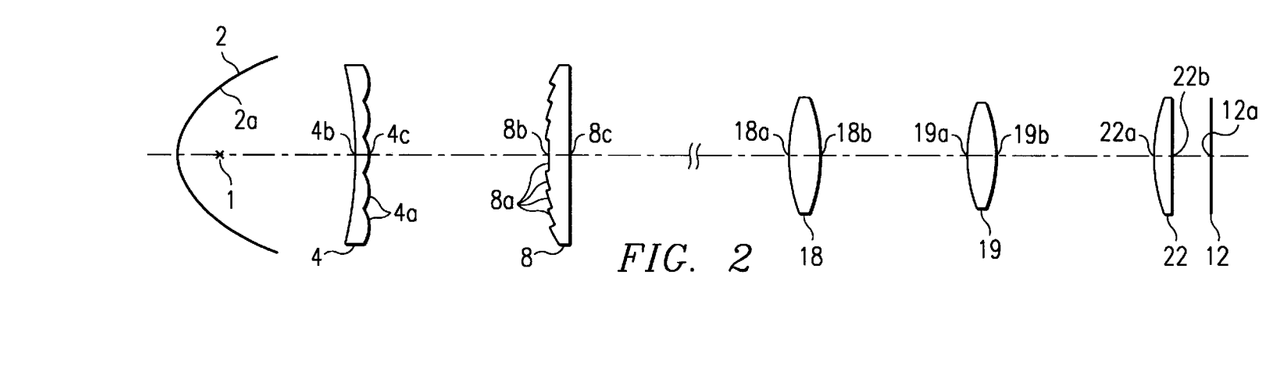
FIG. 2 is a diagram showing an arrangement of elements located on a path of light propagating from a light source to an image panel via a relay optical system and a field lens having a large refractive index.

FIG. 2 is a diagram showing elements located on a path of light propagating from the light source 1 to the image panel 12 via the relay optical system in detail. The ellipsoidal mirror 2 has the reflection surface 2a having a paraxial radius of curvature R of 19 mm and a quadric surface parameter ϵ of 0.11. At this case, if it is assumed that the optic axis is an X-axis and a point where the cross section of the reflection surface 2a intersects with the optical axis is an origin as shown in FIG. 2, an X-coordinate of the cross section of the reflection surface 2a in a point located at height H from the optic axis is given by Equation (1).

$$X = H^2 / [R^2 \{1 + (1 - \epsilon H^2/R^2)^{1/2}\}] \tag{1}$$

The first lens array 4 is positioned such that a point of its incidence surface 4b intersecting with the optic axis is spaced by 74.1 mm away from a point of the reflection surface 2a intersecting with the optic axis, and has an Abbe number vd of 65.41 and a refractive index of 1.46976 with respect to a C-line of wavelength of 656.28 nm. Further, the first lens array 4 is shaped such that the dimensions of the incidence surface 4b and emergence surface 4c is 10.8 mm×13.8 mm, its thickness along the optic axis is 3 mm, a radius of curvature of the concave incidence surface 4b is 132 mm, and a radius of curvature of the convex first lenses 4a located on the emergence surface 4c is 38.5 mm.

The second lens array 8 is an eccentric lens array which is positioned such that a point of an incidence surface 8b intersecting with the optic axis is spaced by 71.6 mm away from a point of the emergence surface 4c intersecting with the optic axis, and has an Abbe number vd of 65.41 and a refractive index of 1.46976 with respect to the C-line. Further, the second lens array 8 is shaped such that the dimensions of the incidence surfaces 8b and emergence surface 8c is 10.8 mm×6.9 mm, its thickness along the optic axis is 6 mm, a radius of curvature of the convex first lenses 8a located on the incidence surface 8b is 24.8 mm, and the emergence surface 8c is planar.

The lens 18 is a convex lens which is positioned such that a point of an incidence surface 18a intersecting with the optic axis is spaced by 164 mm away from the point of the emergence surface 8c intersecting with the optic axis, and has an Abbe number vd of 64.12 and a refractive index of 1.51432 with respect to the C-line. Further, the lens 18 is shaped such that its thickness along the optic axis is 12 mm and radii of curvature of the convex incidence and emergence surfaces 18a, 18b are both 58.285 mm.

The lens 19 is a convex lens which is positioned such that a point of an incidence surface 19a intersecting with the optic axis is spaced by 57.4 mm away from a point of the emergence surface 18b intersecting with the optic axis, and has an Abbe number vd of 25.43 and a refractive index of 1.7961 with respect to the C-line. Further, the lens 19 is shaped such that its thickness along the optic axis is 10 mm and radii of curvature of the convex incidence and emergence surfaces 19a, 19b are both 68.089 mm.

A field lens 22 is positioned such that a point of an incidence surface 22a intersecting with the optic axis is spaced by 59.3 mm away from a point of the emergence surface 19b intersecting with the optic axis, and has an Abbe number vd of 25.43 and a refractive index of 1.7961 with respect to the C-line. Further, the lens 22 is shaped such that its thickness along the optic axis is 8 mm, a radius of curvature of a convex incidence surface 22a is 49.015 mm, and an emergence surface 22b is planar. The glass material of the first and second lens arrays 4, 8 is Pyrex™; the glass material of the lens 18 is BK7; and the glass material of the lens 19 and the field lens 22 is SF6.

The relay optical system including the lens 18 and 19 and the field lens 22 constitute a light propagation system of the projector.

The size of the image panel 12 is 1.3 inches, and a point of its incidence surface 12a intersecting with the optic axis is spaced by 15.5 mm away from a point of the emergence surface 22b intersecting with the optic axis.

Referring back to FIG. 1, the randomly polarized light irradiated from the light source 1 as well as the light reflected by the reflection surface 2a of the ellipsoidal mirror 2 have their components within the wavelength regions unnecessary for the three wavelength regions of R, G and B cut by the IR-UV filter 3. The obtained light is split into a plurality of beams by the first lens array 4.

A number of beams split by the first lens array 4 are split into the beams 6 of the first linearly polarized light components and the beams 7 of the second linearly polarized light components by the polarized beam splitter 5, the axes of polarization of the first and second linearly polarized light components being normal to each other. Specifically, the beams emerging from the emergence surface of the first lens array 4 is propagated straight in the splitter 5 as incident light. The first linearly polarized light components of the incident light are reflected at 90° by the polarized beam splitting surface 5a after having been incident thereon at 45°, and emerge from the splitter 5 as the beams 6. Further, the second linearly polarized light components of the incident light which are propagated straight along the optic path produced by the thickness 5b without being reflected by the polarized light splitting surface 5a are reflected at 90° by the full-reflection surface 5c after having been incident thereon at 45°, and emerge as the beams 7.

A number of beams 6 and a number of beams 7 form as many small light sources as a plurality of beams split by the first lens array 4 in vicinity of the second lens array 8 by the focusing action of the first lens array 4. Among the small light sources formed on the second lens array 8, the half-wave plates 9 are mounted on the emergence surfaces of the second lenses 8a where the small light sources are formed by the beams 7. Thus, the axis of polarization of the second linearly polarized light components of the beams 7 is converted into that of the first linearly polarized light components of the beam 6, thereby aligning the axes of polarization of all small light sources.

The beams which emerge from the second lens array 8 mounted with the half-wave plates 9 and have their axes of polarization aligned are split into the wavelength regions of three colors of R, G and B by the dichroic mirrors 13, 16. Specifically, the beams in the wavelength region of B split by the dichroic mirror 13 illuminate the image panel 10 after being reflected by the full-reflection mirror 14 and passing the field lens 15. The beams in the wavelength regions of R and G pass the dichroic mirror 13. The beams in the wavelength region of G illuminate the image panel 11 after being reflected by the dichroic mirror 16 and passing the field lens 17.

The beams in the wavelength region of R pass the dichroic mirror 16 and are focused in vicinity of the lens 18 at an illumination area substantially similar to the image panel 12 by the second lens array 8. The focused illumination light in the wavelength region of R is gathered in vicinity of the lens 19 by the lens 18, and is introduced to the field lens 22 by the lens 19. The introduced illumination light in the wavelength region of R illuminates the image panel 12 at an illumination area focused in vicinity of the lens 18 and having a substantially similar shape to the image panel 12 via the field lens 22.

Figure 3:
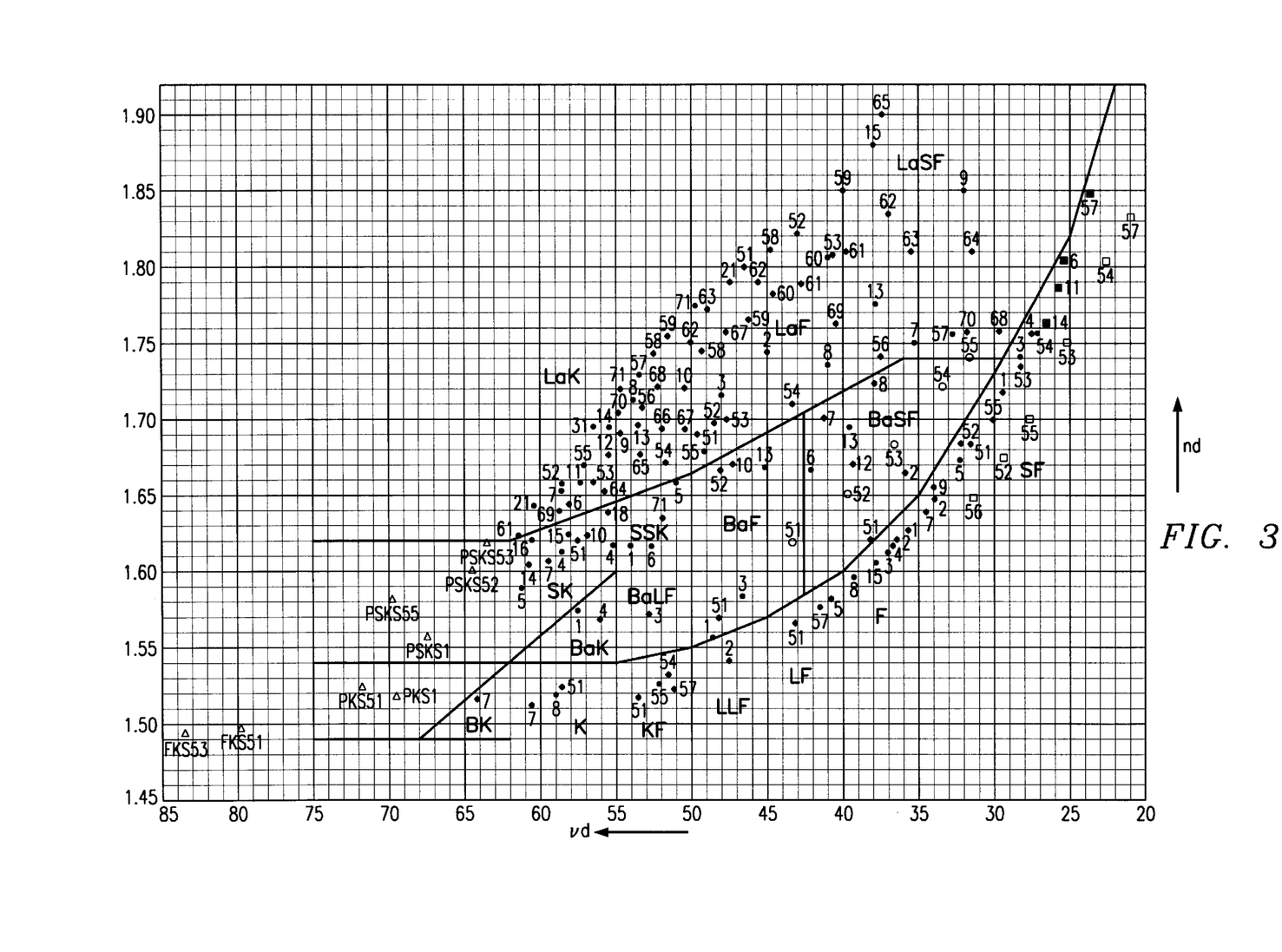
FIG. 3 is a graph showing a relationship between refractive index nd and Abbe number vd of the respective glass materials.

The field lens 22 focuses the illumination light in the wavelength region of R in vicinity of the lens 19 on the pupil of the projection lens 24. The field lens 22 has a large refractive index of 1.7961 with respect to the C-line (656.28 nm) as seen from FIG. 3 showing the refractive indices and Abbe numbers of the respective glass materials. Accordingly, the lens need not have a large curvature, and the incident light is not largely refracted even in a position distant from the optical axis. Thus, an undesirable event where the illumination area of the illumination light in the wavelength region of R is focused with the barrel form distortion can be prevented.

In FIG. 3, the vertical axis represents refractive index (the higher, the larger refractive index), and the horizontal axis represents Abbe number (larger to the right). Since the refractive index of the field lens 22 is large, the curvature of field of the field lens 22 is flattened as compared to field lenses having smaller refractive indices, and the image surface of the field lens 22 approximates to that of the illumination light focused in vicinity of the lens 19. As a result, the image panel 12 can be illuminated at a uniform image side numerical aperture NA. It is preferred that the field lens 22 have a large refractive index. For the lens 19 as well, the larger the refractive index, the smaller the aberration. Thus, the large refractive index is advantageous for the image surface of the illumination light focused in vicinity of the lens 19.

Figure 4A:
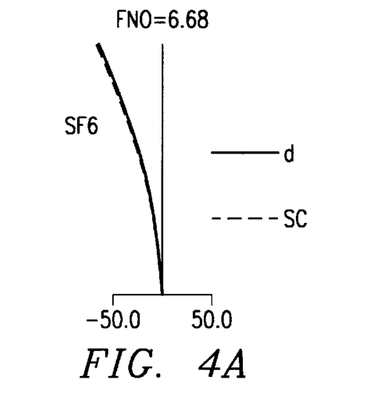
FIGS. 4A to 4C are graphs showing spherical aberration, astigmatism, and distortion at an optic axis of first and second lens arrays of the projector on the image panel, respectively.
Figure 4B:
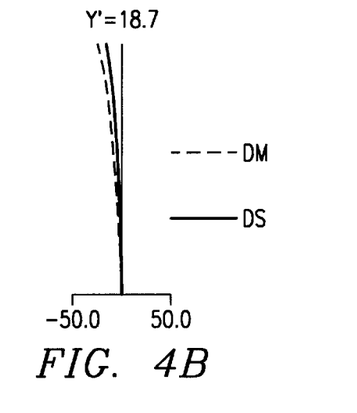
Figure 4C:
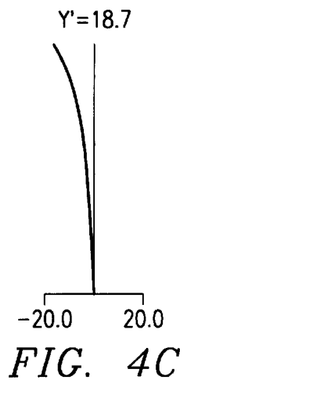

The spherical aberration, astigmatism and distortion at the optic axis of the first and second lens arrays 4, 8 which are obtained as a result of large refractive indices are shown in FIGS. 4A to 4C, respectively. The vertical axis of FIG. 4A represents an effective F-number, and vertical axes of FIGS. 4B and 4C represent an image height Y'. In FIGS. 4A to 4C, a solid line d represents an aberration with respect to a d-line (587.56 nm), and a broken line SC represents a sine condition. A broken line DM and a solid line DS represents astigmatisms with respect to the d-line on a meridional surface and a sagittal surface, respectively. The same can be said for FIGS. 6, 8, 9 and 10.

Figure 5:
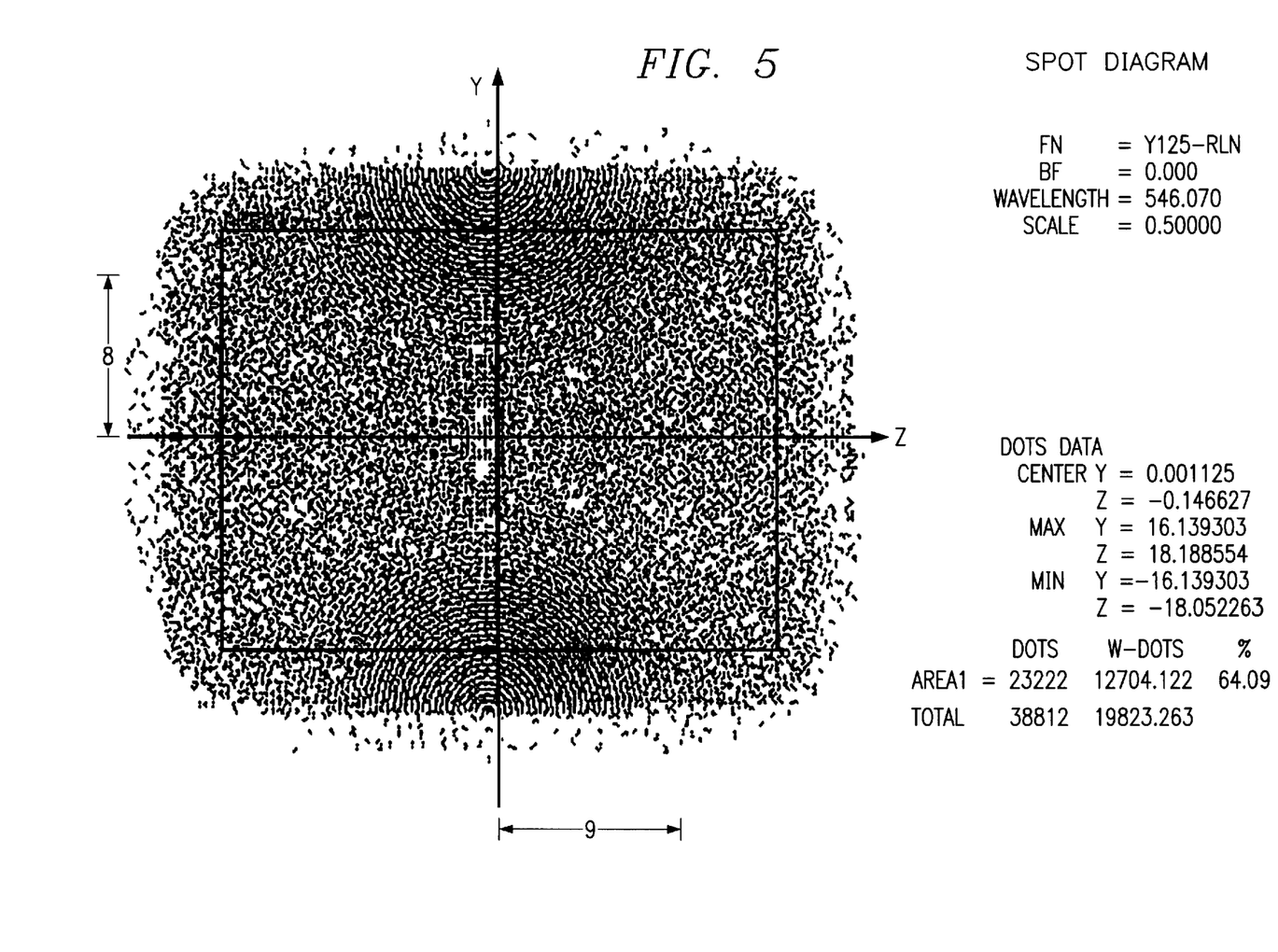
FIG. 5 is a spot diagram showing a state of an illumination area of illumination light in a wavelength region of R which is projected on the image panel via the large refractive index field lens.

Further, the state of the illumination area of the illumination light of the wavelength region of R projected on the image panel 12 is shown in FIG. 5. An area enclosed by a rectangular solid line of FIG. 5 corresponds to a display area of the image panel 12.

The transmissivities of the respective wavelengths in the relay optical system of this embodiment is shown in TABLE-1A, and those in a conventional optical system are shown in TABLE-1B.

TABLE 1A

| WAVELENGTH [μm] | TRANSMISSIVITY |
| --- | --- |
| 0.550 | 0.96802 |
| 0.560 | 0.97403 |
| 0.570 | 0.97908 |
| 0.580 | 0.98317 |
| 0.590 | 0.98629 |
| 0.600* | 0.98844 |
| 0.610 | 0.98920 |
| 0.620 | 0.98902 |
| 0.630 | 0.98793 |
| 0.640 | 0.98597 |
| 0.650 | 0.98316 |
| 0.660 | 0.97954 |
| 0.670 | 0.97515 |
| 0.680* | 0.97002 |
| 0.690 | 0.96389 |
| 0.700 | 0.95708 |

TABLE 1B

| WAVELENGTH [μm] | TRANSMISSIVITY |
| --- | --- |
| 0.560 | 0.98394 |
| 0.570 | 0.98665 |
| 0.580 | 0.98885 |
| 0.590 | 0.99034 |
| 0.600* | 0.99093 |
| 0.610 | 0.98847 |
| 0.620 | 0.98490 |
| 0.630 | 0.98023 |
| 0.640 | 0.97445 |
| 0.650 | 0.96753 |
| 0.660 | 0.95949 |
| 0.670 | 0.95031 |
| 0.680* | 0.93999 |
| 0.690 | 0.92652 |
| 0.700 | 0.91186 |

The relay optical system is constructed using the lenses having large refractive indices as described above. Accordingly, the transmissivity of the relay optical system, in which the lens 18 is provided with three-layer coating as in the prior art, but the lens 19 and the field lens 22 are provided with single layer coating, is not largely different from the transmissivity of the prior art relay optical system in which the relay lens and the field lens are provided with three-layer coating. Thus, the production process can be simplified.

Referring back to FIG. 1, optical images formed by the three image panels 10 to 12 are combined by the dichroic prism 23. Specifically, the optical image of B formed by the image panel 10 is propagated straight into the dichroic prism 23 as incident light, and is reflected at 90° by the first dichroic mirror portion 23b after having been incident thereon at 45°, and emerges toward the projection lens 24. The optical image of R formed by the image panel 12 also is all propagated straight into the dichroic prism 23 as incident light, and is reflected at 90° by the second dichroic mirror portion 23c after having been incident thereon at 45°, and emerges toward the projection lens 24. The optical image of G formed by the image panel 11 is propagated straight all the way through the dichroic prism 23 as incident light without being reflected by the first and second dichroic mirror portions 23b, 23c, and emerges toward the projection lens 24.

In this way, the optical images formed by the three image panels 10 to 12 are combined by being projected onto the projection lens 24 located in the same direction while the axes of polarization of the optical images are coincided with the optic axis. The thus combined optical image is enlargely projected on the screen by the projection lens 24.

Figure 6A:
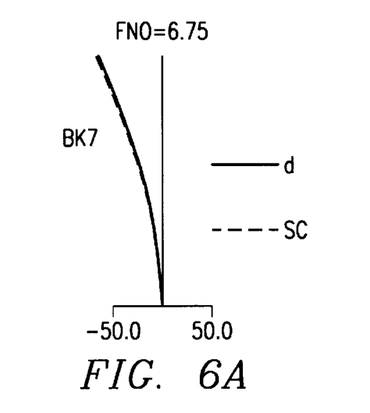
FIGS. 6A to 6C are graphs showing spherical aberration, astigmatism, and distortion at an optic axis of first and second lens arrays on an image panel via a conventional field lens, respectively.
Figure 6B:
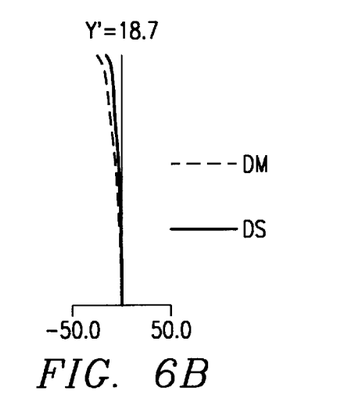
Figure 6C:
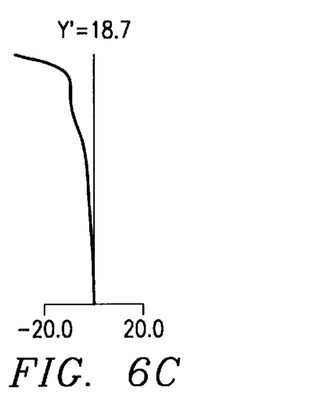
Figure 7:
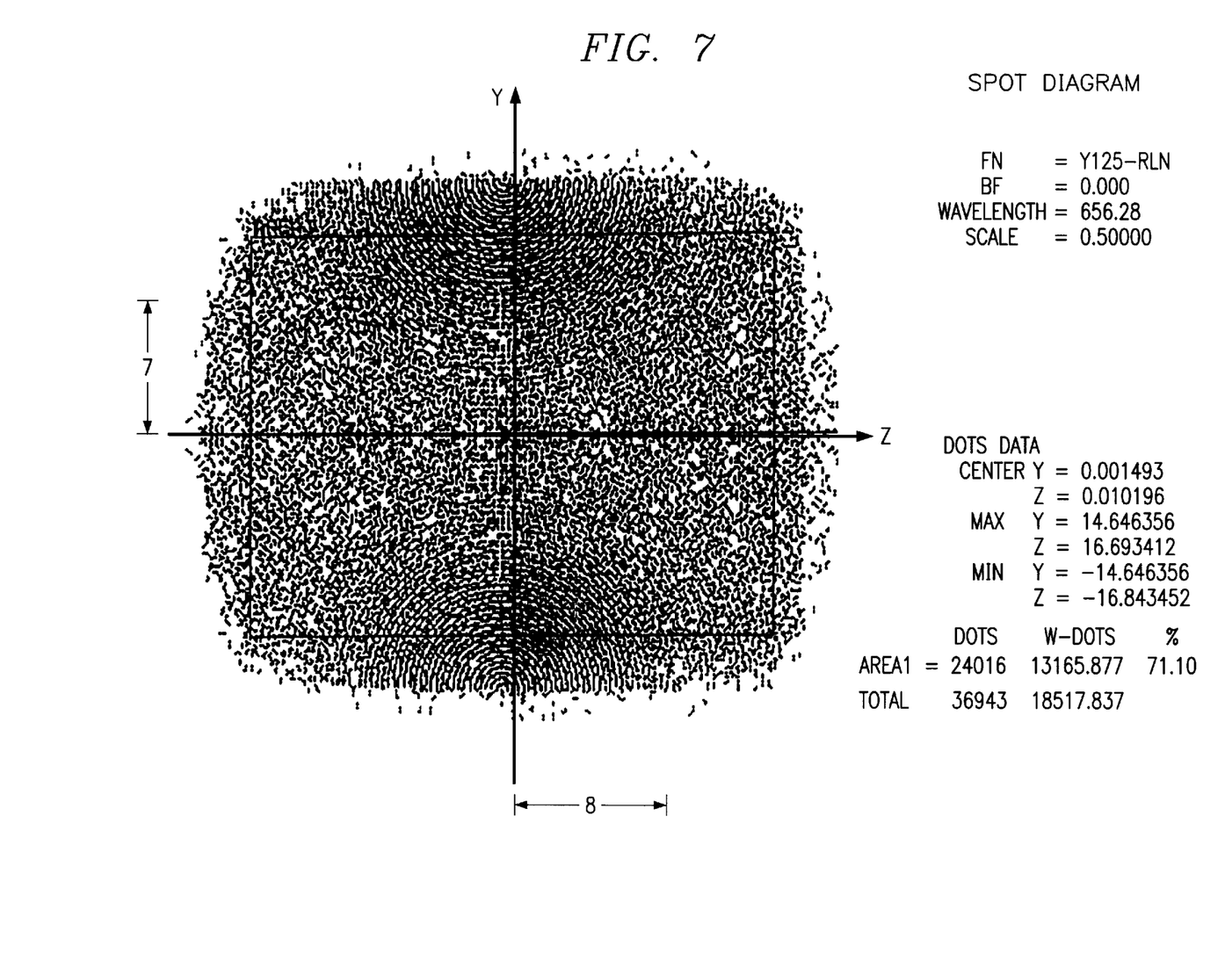
FIG. 7 is a spot diagram showing a state of an illumination area of illumination light in a wavelength region of R which is projected on the image panel via the conventional field lens.

For comparison, aberration graphs corresponding to FIGS. 4A to 4C obtained by replacing only the lens 19 and the field lens 22 of this embodiment by those used in the conventional optical system are shown in FIGS. 6A to 6C. The relay lens and the field lens for FIGS. 6A to 6C are made of glass material BK7. Comparison of FIGS. 6A to 6C with FIGS. 4A to 4C shows that the distortion is particularly reduced in this embodiment. Similarly, a spot diagram concerning the illumination area corresponding to FIG. 5 is shown in FIG. 7. Comparison of FIG. 7 with FIG. 5 shows that tolerances for the four corners of the display surface of the image panel are larger in this embodiment than in the conventional optical system.

Next, a first modification of the present invention will be described. In the first modification, a lens 19 is a convex lens which is positioned such that a point of an incidence surface 19a intersecting with the optic axis is spaced by 57.4 mm away from a point of an emergence surface 18b intersecting with the optic axis, and has an Abbe number vd of 51.57 and a refractive index of 1.75007 with respect to a C-line (656.28 nm). Further, the lens 19 is shaped such that its thickness along the optic axis is 10 mm and radii of curvature of the convex incidence and emergence surfaces 19a, 19b are both 63.738 mm.

A field lens 22 is positioned such that a point of an incidence surface 22a intersecting with the optic axis is spaced by 59.3 mm away from a point of the emergence surface 19b intersecting with the optic axis, and has an Abbe number vd of 51.57 and a refractive index of 1.75007 with respect to the C-line. Further, the lens 22 is shaped such that its thickness along the optic axis is 8 mm, a radius of curvature of a convex incidence surface 22a is 45.930 mm, and an emergence surface 22b is planar. The glass materials of the lens 19 and the field lens 22 are both LaK59.

Figure 8A:
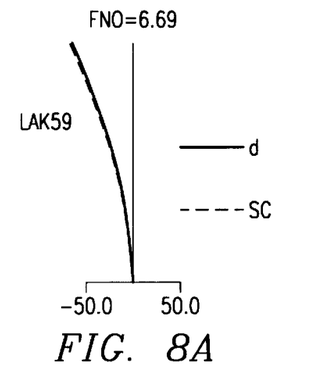
FIGS. 8A to 8C are graphs showing spherical aberration, astigmatism and distortion at an optic axis of first and second lens arrays on an image panel via a first modified light propagation system, respectively.
Figure 8B:
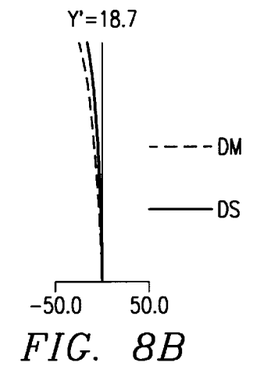
Figure 8C:
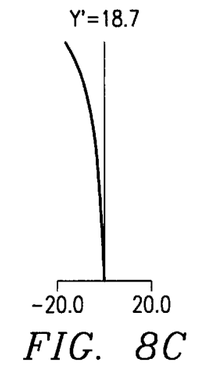

The spherical aberration, astigmatism and distortion at the optic axis of the first and second lens arrays 4, 8 on the image panel 12 which are obtained by the first modified light propagation system are shown in FIGS. 8A to 8C, respectively. The state of the illumination area of the illumination light in the wavelength region of R projected on the image panel 12 is substantially the same as the one shown in FIG. 5.

The transmissivities of the respective wavelengths in the relay optical system of the first modification are shown in TABLE-2.

TABLE 2

| WAVELENGTH [μm] | TRANSMISSIVITY |
| --- | --- |
| 0.560 | 0.98433 |
| 0.570 | 0.98506 |
| 0.580 | 0.98506 |
| 0.590 | 0.98433 |
| 0.600* | 0.98288 |
| 0.610 | 0.98053 |
| 0.620 | 0.97750 |
| 0.630 | 0.97381 |
| 0.640 | 0.96950 |
| 0.650 | 0.96458 |
| 0.660 | 0.95909 |
| 0.670 | 0.95304 |
| 0.680* | 0.94648 |
| 0.690 | 0.93927 |
| 0.700 | 0.93158 |

The relay optical system is constructed using the lenses having large refractive indices. Accordingly, it is sufficient that the lens coatings of the lens 19 and the field lens 22 be a single layer coating as mentioned above.

Next, a second modification of the present invention will be described. In the second modification, a lens 19 is a convex lens which is positioned such that a point of an incidence surface 19a intersecting with the optic axis is spaced by 57.4 mm away from a point of an emergence surface 18b intersecting with the optic axis, and has an Abbe number vd of 64.12 and a refractive index of 1.51432 with respect to a C-line (656.28 nm). Further, the lens 19 is shaped such that its thickness along the optic axis is 10 mm and radii of curvature of the convex incidence and emergence surfaces 19a, 19b are both 43.409 mm.

A field lens 22 is positioned such that a point of an incidence surface 22a intersecting with the optic axis is spaced by 59.3 mm away from a point of the emergence surface 19b intersecting with the optic axis, and has an Abbe number vd of 25.43 and a refractive index of 1.7961 with respect to the C-line. Further, the lens 22 is shaped such that its thickness along the optic axis is 8 mm, a radius of curvature of a convex incidence surface 22a is 49.015 mm, and an emergence surface 22b is planar. The glass material of the lens 19 is BK7 and that of the field lens 22 is SF6.

Figure 9A:
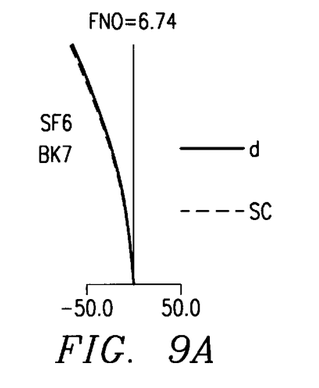
FIGS. 9A to 9C are graphs showing spherical aberration, astigmatism and distortion at an optic axis of first and second lens arrays on an image panel via a second modified light propagation system, respectively.
Figure 9B:
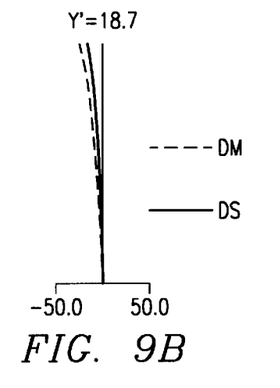
Figure 9C:
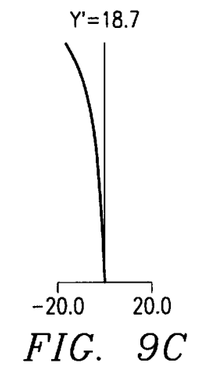

The spherical aberration, astigmatism and distortion at the optic axis of the first and second lens arrays 4, 8 on the image panel 12 which are obtained by the second modified light propagation system are shown in FIGS. 9A to 9C, respectively.

A third modification of the present invention will be described. In the third modification, a lens 19 is a convex lens which is positioned such that a point of an incidence surface 19a intersecting with the optic axis is spaced by 57.4 mm away from a point of an emergence surface 18b intersecting with the optic axis, and has an Abbe number vd of 64.12 and a refractive index of 1.51432 with respect to a C-line. Further, the lens 19 is shaped such that its thickness along the optic axis is 10 mm and radii of curvature of the convex incidence and emergence surfaces 19a, 19b are both 43.409 mm.

A field lens 22 is positioned such that a point of an incidence surface 22a intersecting with the optic axis is spaced by 59.3 mm away from a point of the emergence surface 19b intersecting with the optic axis, and has an Abbe number vd of 51.57 and a refractive index of 1.75007 with respect to the C-line. Further, the lens 22 is shaped such that its thickness along the optic axis is 8 mm, a radius of curvature of a convex incidence surface 22a is 45.930 mm, and an emergence surface 22b is planar. The glass material of the lens 19 is BK7 and that of the field lens 22 is LaK59.

Figure 10A:
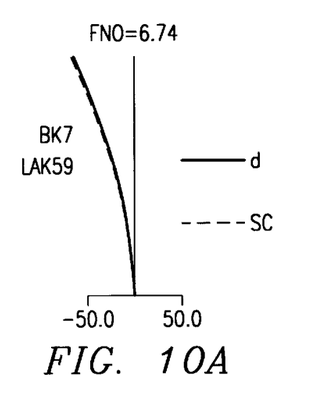
FIGS. 10A to 10C are graphs showing spherical aberration, astigmatism and distortion at an optic axis of first and second lens arrays on an image panel via a third modified light propagation system, respectively.
Figure 10B:
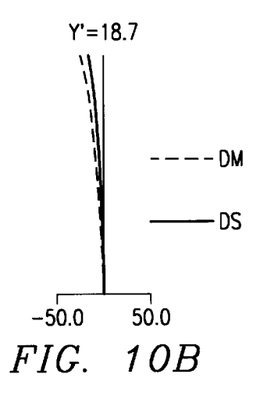
Figure 10C:
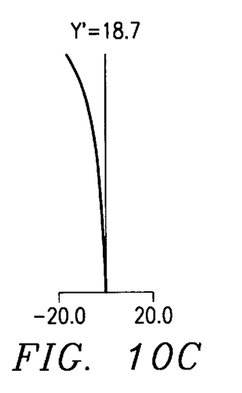

The spherical aberration, astigmatism and distortion at the optic axis of the first and second lens arrays 4, 8 on the image panel 12 which are obtained by the third modified light propagation system are shown in FIGS. 10A to 10C, respectively.

In the foregoing embodiments, the half-wave plates 9 are arranged across all the portions of the emergence surface of the second lens array 8 where the beams 7 emerge. However, half-wave plates may be arranged on a part of the portions of the emergence surface of the second lens array 8 where the beams 7 emerge.

In the foregoing embodiments, further, the half-wave plates 9 are mounted on the emergence surfaces of the second lenses 8a where the small light sources formed by the beams 7 are positioned. However, half-wave plates may be mounted on the emergence surfaces of the second lenses 8a where the small light sources formed by the beams 6 are positioned. It is sufficient that half-wave plates be mounted on all or a part of the second lenses 8a where the small light sources formed by the beams 6 or 7 are positioned.

Furthermore, although a metal halide lamp is used as the light source 1 in the foregoing embodiment, a xenon lamp or halogen lamp may be used.

As is clear from the above description, the illumination area can be enlarged without accompanying a light loss. Further, the image panel can be illuminated at a more uniform image side numerical aperture NA.

Further, a single-layer coated lens can be used in an optical system of a projector. In the present invention, even if a lens coated with a single antireflection layer is used for a relay optical system or a field lens located at an emergence side of the relay optical system, the transmissivity can be held in the same level as the conventional optical system provided with a three-layer coated lens.

Although the present invention has been fully described by way of example with reference to the accompanying drawings, it is to be understood that various changes and modifications will be apparent to those skilled in the art.

Therefore, unless otherwise such changes and modifications depart from the scope of the present invention, they should be construed as being included therein.

What is claimed is:

1. A projector comprising:
an illuminator which produces illumination light;
an image member which forms a light image using illumination light;
a field lens positioned immediately prior to the image member; and
a light propagation system, extending between the illuminator and the field lens, which propagates illumination light from the illuminator to the image member, the light propagation system including a relay optical system having a plurality of lenses,
wherein at least one lens from a group consisting of the field lens and the plurality of lenses has a refractive index of at least approximately 1.75.

2. A projector according to claim 1, wherein
one of the plurality of lenses is a relay lens; and
the field lens, located at an emergence side of the relay optical system, has a refractive index of at least approximately 1.75.

3. A projector according to claim 2, wherein the field lens is coated with a single antireflection layer.

4. A projector according to claim 2, wherein the relay lens of the relay optical system has a refractive index of at least approximately 1.75.

5. A projector according to claim 2, wherein the relay lens is coated with a single antireflection layer.

6. A projector according to claim 1, wherein the light propagation system includes:
a light splitter which splits illumination light into a plurality of light components having different wavelength regions;
a plurality of image panels provided to respectively receive the plurality of light components, wherein each image panel forms a light image from a light component;
a plurality of optical systems, including the relay optical system, which respectively introduce the plurality of light components to the image member as well as corresponding image panels, wherein each optical system defines a propagating path, and each propagating path has a different length,
wherein a first propagating path having a greatest length is defined by the relay optical system, and
wherein the relay optical system has a relay lens.

7. A projector according to claim 6, wherein the field lens is coated with a single antireflection layer.

8. A projector according to claim 6, wherein the relay lens of the relay optical system has a refractive index of at least approximately 1.75.

9. A projector according to claim 8, wherein the relay lens is coated with a single antireflection layer.

10. A projector according to claim 6, wherein the light splitter includes a dichroic mirror.

11. A projector according to claim 1, wherein the image member includes a liquid crystal panel.

12. A projector according to claim 6, wherein the relay optical system and field lens effects a focusing of its light component and minimizes refraction thereof so as to assure a prescribed illumination area and a prescribed light amount at the light member.

13. A projector according to claim 1, further comprising a projection optical system, following the image member, to enlargedly project the light image formed on the image member.

14. A projector comprising:
an illuminator which produces illumination light;
an image member which forms a light image using illumination light; and
a light propagation system which propagates illumination light from the illuminator to the image member, the light propagation system including a plurality of lenses, at least one of the plurality of lenses having a refractive index of at least approximately 1.7 to focus the illumination light to attain a prescribed illumination area, a prescribed light amount, and a uniform numerical aperture at the image member.

15. A projector according to claim 14, further comprising a field lens located at an emergence side of the relay optical system, the field lens having a refractive index of at least approximately 1.7.

16. A projector according to claim 15, wherein the field lens is coated with a single antireflection layer.

17. A projector according to claim 14, wherein the plurality of lenses includes a relay lens.

18. A projector according to claim 17, wherein the relay lens is coated with a single antireflection layer.

19. A projector according to claim 17, wherein the relay lens has a refractive index of at least approximately 1.7.

20. A projector according to claim 14, further comprising a projection optical system, following the image member, to enlargedly project the light image formed on the image member.

21. A projector comprising:
an illuminator which produces illumination light;
an image member which forms a light image using illumination light;
a light splitter which splits illumination light from the illuminator into a plurality of light components having different wavelength regions; and
a light propagation system, which propagates illumination light subsequent to the light splitter to the image member, which includes a plurality of lenses, at least one of the plurality of lenses having a refractive index of at least approximately 1.75.

22. A projector according to claim 21, wherein the light propagation system includes:
a relay optical system including a relay lens; and
a field lens located at an emergence side of the relay optical system, the field lens having a refractive index of at least approximately 1.75.

23. A projector according to claim 22, wherein the field lens is coated with a single antireflection layer.

24. A projector according to claim 22, wherein the relay lens has a refractive index of at least approximately 1.75.

25. A projector according to claim 22, wherein the relay lens is coated with a single antireflection layer.

26. A projector according to claim 21, wherein the image member includes a liquid crystal panel.

27. A projector comprising:
an illuminator which produces illumination light;
an image member which forms a light image using illumination light;
a relay optical system; and
a field lens located between an exit side of the relay optical system and an entrance side of the image member so as to project illumination light produced by the illuminator from the relay optical system onto the image member,
wherein the field lens has a refractive index of at least 1.75.

28. A projector according to claim 27, wherein the field lens is coated with a single antireflection layer.

29. A projector according to claim 27, wherein the relay optical system includes a relay lens, and the relay lens has a refractive index of at least approximately 1.75.

30. A projector according to claim 29, wherein the relay lens is coated with a single antireflection layer.

31. A projector according to claim 27, wherein the image member includes a liquid crystal panel.

32. A projector comprising:

an illuminator which produces illumination light;

a plurality of image members, each of which forms a light image using illumination light, wherein a distance from the illuminator to one of the image members is different than a distance from the illuminator to another of the image members; and a relay optical system, being positioned in an optical path between the illuminator and the one of the image members and having a relay lens, to propagate illumination light to the one of the image members, wherein the relay lens has a refractive index of at least 1.75.

33. A projector according to claim 32, wherein the relay lens is coated with a single antireflection layer.

34. A projector according to claim 32, further comprising a field lens, wherein the field lens has a refractive index of at least 1.75.

35. A projector according to claim 34, wherein the field lens is coated with a single antireflection layer.

36. A projector according to claim 32, wherein an image member includes a liquid crystal panel.

37. A projector according to claim 32, further comprising a light splitter which splits illumination light produced by the illuminator.

* * * * *

UNITED STATES PATENT AND TRADEMARK OFFICE
CERTIFICATE OF CORRECTION

PATENT NO. : 6,120,153
DATED : September 19, 2000
INVENTOR(S) : Takashi Ohta

Page 1 of 1

It is certified that error appears in the above-identified patent and that said Letters Patent is hereby corrected as shown below:

On the Title Page
[75] Inventor:, after "Ohta,", delete "Sakai,", and insert --Sakai-Shi,--.

Column 2,
Line 22, after "light amount.", insert --Ther high refractive index being 1.75 or more--.

Column 11,
Line 18 (claim 1, line 14), delete "approximately".
Line 23 (claim 2 line 5), delete "approximately".
Line 28 (claim 4, line 3), delete "approximately".
Line 52 (claim 8, line 3), delete "approximately".

Column 12,
Line 40 (claim 21, line 12), delete "approximately".
Line 46 (claim 22, line 6,), delete "approximately".
Line 50 (claim 24, line 2,), delete "approximately".

Column 13,
Line 5 (claim 29, line 3), delete "approximately".

Signed and Sealed this

Nineteenth Day of June, 2001

*Attest:*

*Nicholas P. Godici*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,120,153
DATED : September 19, 2000
INVENTOR(S) : Takashi Ohta

It is certified that error appears in the above-identified patent and that said Letters Patent is hereby corrected as shown below:

Title page,
Item [75] Inventor, after "Ohta," delete "Sakai," and insert -- Sakai-Shi, --.

Column 2,
Line 22, after "light amount.", insert -- The high refractive index being 1.75 or more --.

Column 11,
Lines 18, 23, 28 and 52, delete "approximately".

Column 12,
Lines 40, 46 and 50, delete "approximately".

Column 13,
Line 5, delete "approximately".

This certificate supercedes Certificate of Correction issued June 19, 2001.

Signed and Sealed this

Twelfth Day of March, 2002

Attest:

JAMES E. ROGAN
Attesting Officer
Director of the United States Patent and Trademark Office